(12) United States Patent
Van Beugen et al.

(10) Patent No.: US 11,268,644 B2
(45) Date of Patent: *Mar. 8, 2022

(54) FLOW STOPPING TOOL FOR PIPELINES

(71) Applicant: J. VAN BEUGEN BEHEER B.V., Hellevoetsluis (NL)

(72) Inventors: Leonard Van Beugen, Goudswaard (NL); Enver Coric, Schiedam (NL)

(73) Assignee: J. van Beugen Beheer B.V., Hellevoetsluis (NL)

(*) Notice: Subject to any disclaimer, the term of this patent is extended or adjusted under 35 U.S.C. 154(b) by 174 days.

This patent is subject to a terminal disclaimer.

(21) Appl. No.: 16/415,078

(22) Filed: May 17, 2019

(65) Prior Publication Data
US 2019/0353292 A1 Nov. 21, 2019

(30) Foreign Application Priority Data

May 18, 2018 (NL) ...................................... 2020957

(51) Int. Cl.
*F16L 55/12* (2006.01)
*F16L 55/124* (2006.01)

(52) U.S. Cl.
CPC .................................. *F16L 55/124* (2013.01)

(58) Field of Classification Search
CPC .................................................... F16L 55/124
USPC .................................. 138/93, 94, 92, 31, 110
See application file for complete search history.

(56) References Cited

U.S. PATENT DOCUMENTS

| | | | | | |
|---|---|---|---|---|---|
| 1,747,933 | A | * | 2/1930 | Goodman | F16L 55/124 138/94 |
| 2,811,985 | A | * | 11/1957 | Wells | F16L 55/124 138/93 |
| 3,607,361 | A | * | 9/1971 | Hight | B05C 7/08 427/238 |
| 3,842,864 | A | * | 10/1974 | Riegel | F16L 55/124 138/93 |
| 4,417,598 | A | * | 11/1983 | DePirro | E03F 7/04 137/2 |
| 4,458,721 | A | * | 7/1984 | Yie | F16K 7/10 137/318 |

(Continued)

FOREIGN PATENT DOCUMENTS

| | | |
|---|---|---|
| DE | 2712952 A1 | 9/1978 |
| DE | 2923880 A1 | 12/1980 |

(Continued)

OTHER PUBLICATIONS

International Search report and Written Opinion dated Jan. 16, 2019 for NL2020957.

*Primary Examiner* — James F Hook
(74) *Attorney, Agent, or Firm* — Hoyng Rokh Monegier B.V.; David P. Owen

(57) ABSTRACT

A flow stopping tool for pipelines is disclosed, wherein the flow stopping tool comprises an inflatable balloon-like element that is in connection to a pressure rod. A hose is used for inflating the balloon-like element with a gas or a fluid, such that the balloon-like element can block a flow in a pipeline. A first end of the hose is in connection to the pressure rod and a second end of the hose is in connection to the balloon-like element. A part connecting the hose with the inflatable balloon-like element, but outside said balloon-like element, comprises a shock absorber for securing the hose-balloon connection.

14 Claims, 8 Drawing Sheets

(56) References Cited

U.S. PATENT DOCUMENTS

| | | | | |
|---|---|---|---|---|
| 5,462,077 A | * | 10/1995 | Cohen | F16K 7/10 |
| | | | | 137/15.08 |
| 5,477,886 A | * | 12/1995 | Van Beugen | B29C 53/602 |
| | | | | 138/93 |
| 5,676,171 A | * | 10/1997 | Heed | F16L 41/06 |
| | | | | 137/318 |
| 5,778,919 A | | 7/1998 | Petrone | |
| 5,934,311 A | * | 8/1999 | Brown | G02B 6/502 |
| | | | | 137/240 |
| 5,996,632 A | * | 12/1999 | Vogel | F16L 55/04 |
| | | | | 137/504 |
| 10,837,563 B2 | * | 11/2020 | Van Beugen | F16K 31/1266 |
| 2007/0246115 A1 | * | 10/2007 | Ord | F16L 55/134 |
| | | | | 138/93 |
| 2013/0133772 A1 | * | 5/2013 | Lorraine | F16L 57/02 |
| | | | | 138/110 |

FOREIGN PATENT DOCUMENTS

| | | | |
|---|---|---|---|
| EP | 0543458 | A1 | 5/1993 |
| EP | 0989344 | A1 | 3/2000 |

* cited by examiner

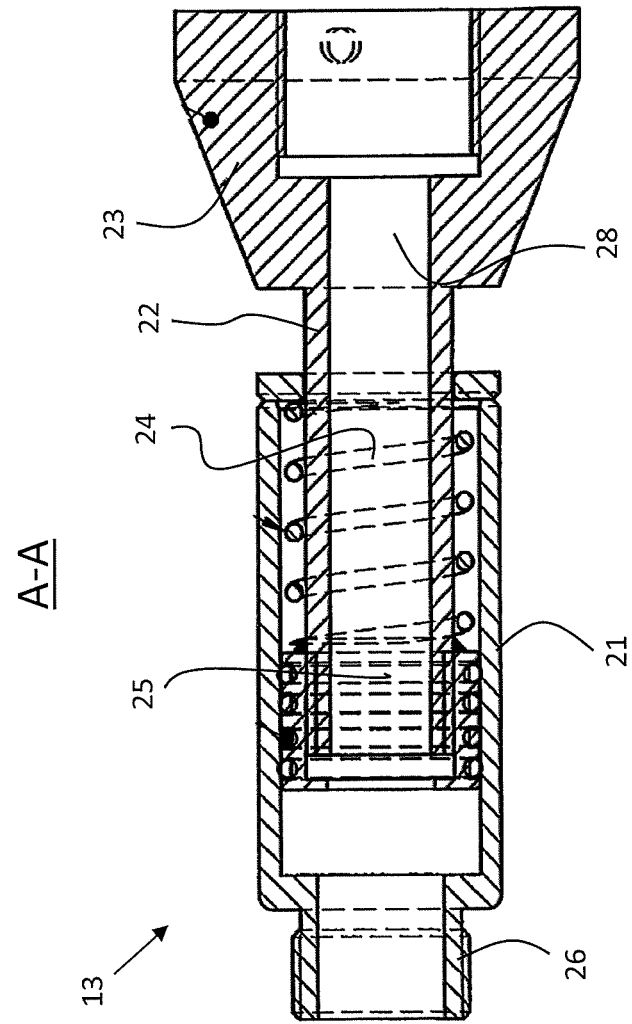

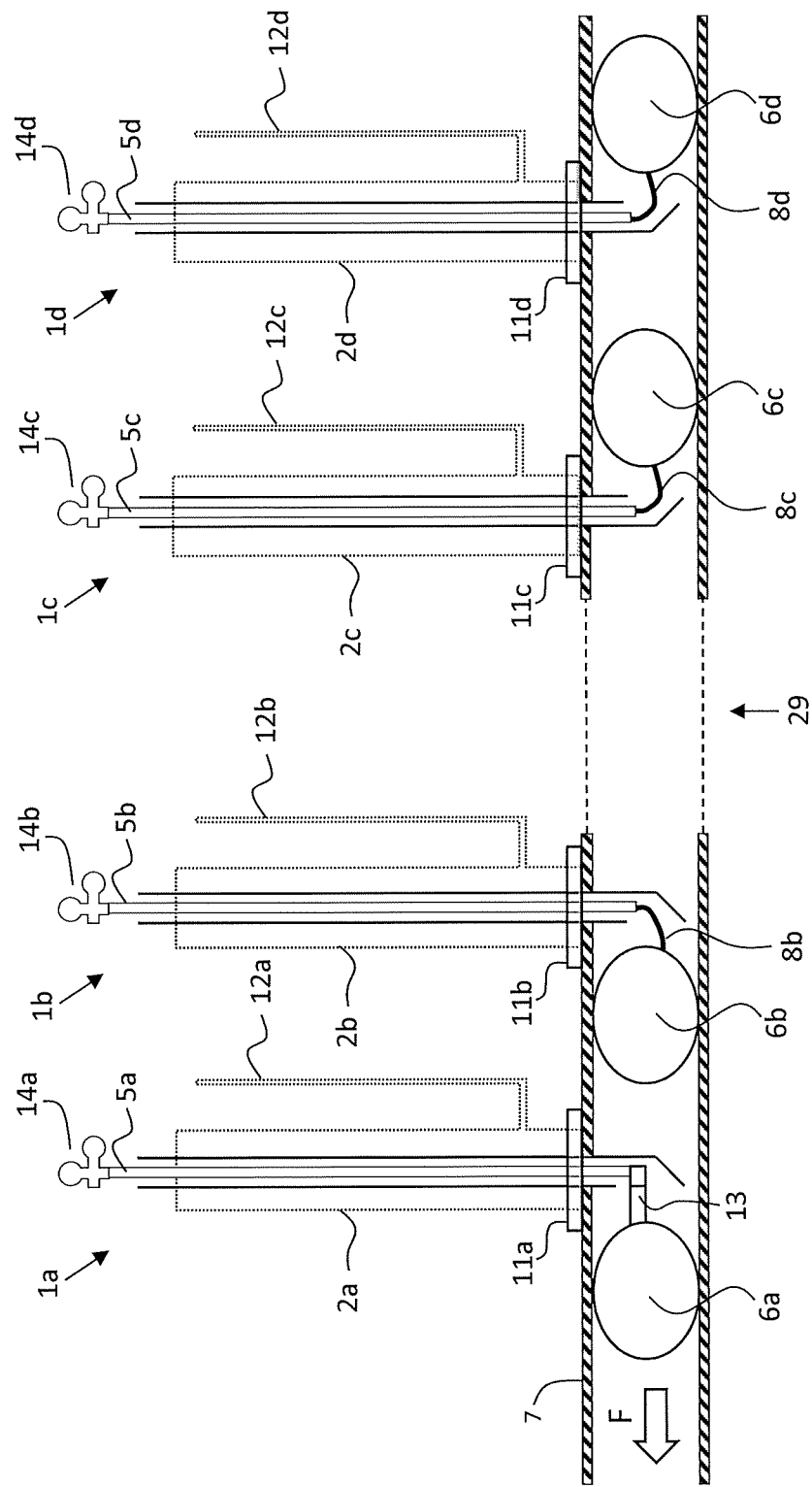

FLOW STOPPING TOOL FOR PIPELINES

TECHNICAL FIELD

The present invention relates to flow stopping tools for live maintenance and new construction operations on pipelines.

BACKGROUND ART

Pipelines are essential for urban and industrial applications. For example, pipelines are used for the transportation of liquids or gases below and above the ground or sea. These type of pipelines typically have operating pressures larger than 8 bar (120 psi). Other type of pipelines are distribution or utility pipelines with typical operating pressures smaller than or equal to 8 bar (120 psi) and are commonly used for the distribution of gasses and liquids to end users such as living quarters and industrial areas. In case a section of a transportation or distribution pipeline needs to be isolated, for example to facilitate maintenance work, repairs or the insertion of tee's or branches, it is necessary to stop the flow in the pipeline. Flow stopping tools are typically used for these type of operations as they allow an operator to insert a stopping device such as an inflatable balloon like element into the pipeline. In this way the operator is not prone to a continuous flow of gasses or liquids that escape once the isolated section is cut.

Known flow stopping tools comprise an external dome that is mounted on a valve which is connected to a pipeline by means of a saddle or welded socket. The external dome facilitates a passage in which a hollow lance can be movably inserted. The hollow lance also comprises a passage itself, through which a pressure rod with inflatable balloon-like element can be movably inserted. The hollow lance further comprises an introducer shoe at its bottom end which can be introduced into the pipeline via the valve. In use, the balloon-like element is pushed downwards towards the introducer shoe, while the balloon-like element is in a deflated state. Once the balloon-like element has been introduced into the pipeline, the balloon-like element is inflated until it reaches a final inflation stage in which the balloon-like element exerts sufficient pressure on the inner wall of the pipeline such that a flow in the pipeline can be stopped.

It is common practice to position further inflated balloon-like elements at locations in the pipeline adjacent to the first balloon-like element using further flow stopping tools. A minimum of one balloon-like element at each side of the isolated section thereby blocks the flow inside the pipeline.

The balloon-like element of known flow stopping tools usually comprises a hose, which has multiple functionalities. Accordingly, the hose is used to inflate the balloon-like element, to align the balloon-like element in the correct position in the pipeline and to secure the balloon-like element in a position while the balloon-like element is brought into the inflated state.

In an intermediate stage where the balloon-like element is being inflated but has not yet reached its final inflation stage, the balloon-like element and hose end part may experience a large kinetic force resulting from the pipeline flow in case this flow has a high flow speed. As a consequence, the hose may get damaged which may result in a leakage of the medium that is used for inflating the balloon-like element. In a worst-case scenario, the balloon-like element may be completely ruptured from the hose and will get lost in the pipeline.

German patent application DE 2923880 relates to a flow stopping tool comprising a balloon which is connected to an insertable pressure rod through a hose. The hose comprises joints that are surrounded by a coil spring. The construction of joint and springs facilitate insertion of the balloon into a pipeline, but does not strengthen the connection between the pressure rod and the balloon.

European patent application EP 0 543 458 describes closing plugs comprising a balloon-like element. The balloon-like element is provided with reinforcement wires such that, during inflation, the balloon extends in the radial direction but shortens in the axial direction of the balloon. The balloon-like element is further provided with an internal guiding shaft having telescopic moving parts and a spring. The guiding shaft is shortened upon inflation in the axial direction. In this way, the balloon only extends in the radial direction. Such an internal guiding shaft does not strengthen the connection between the pressure rod and the balloon.

OBJECTS OF THE INVENTION

One object of the present invention is to provide a balloon like element for use with the flow stopping tool which eliminates the problems inherent to the hose-balloon connection. This and other objects have been attained according to the present invention.

SUMMARY OF THE INVENTION

In a first aspect of the invention there is provided a flow stopping tool for pipelines, wherein the flow stopping tool comprises an inflatable balloon-like element that is adapted for blocking a flow in the pipeline, and wherein the flow stopping tool further comprises a hose for inflating the balloon-like element with a gas or a fluid. A part connecting the hose with the inflatable balloon-like element comprises a shock absorber. This part is located outside the balloon-like element.

The flow stopping tool may further comprise a stopping tower comprising an external dome that is mounted on a valve which is connected to the pipelines by means of a saddle or welded socket, arranged for introducing the balloon-like element into a pressurized pipeline. The stopping tower comprises a moveable, internal hollow lance with an insertion shoe, wherein the movable lance can move inside the external dome. The flow stopping tool further comprises a pressure rod that can move inside the movable lance, wherein the pressure rod is in connection to the inflatable balloon-like element. The hose thereby comprises a coupling element that is in connection to the pressure rod, such as a threaded coupling. The inflatable balloon-like element may be made of a natural reinforced rubber, an elastomer or an elastic material which is able to stop the flow in the pipeline after inflation. The pressure rod may be further arranged with a device for measuring the inflation pressure of the balloon-like element and a device for measuring the pressure in the pipeline in front of the balloon like element.

Preferably, the balloon-like element has a body part made from rubber which is entirely reinforced with a non-elastic fiber extending from one cross cut end to the other cross cut end of the rubber body of the balloon-like element. If such a balloon like element is inflated, the surface of the balloon like element does not increase. Irrelevant from their sizes, such balloon-like elements require the same internal inflation pressure.

Preferably, the balloon-like element can resist a flow inside the pipeline of 5 meter per second. Preferably, the balloon-like element is compatible with a pressure of up to 4 bar. In some embodiments of the invention, the balloon-like element preferably is provided with a flap on one or both of the outer ends of the balloon like element. In a preferred embodiment, the balloon-like element is adapted to close a pipe having a diameter in the range between 200 and 600 millimeter. In a preferred embodiment, the flow stopping tool, being adapted to be connected to the pipeline, comprises an external dome, an internal hollow moveable lance, and inside the movable lance a moveable pressure rod. Preferably, the movable lance comprises an insertion shoe for insertion of the stopper such as a balloon-like element into a pipeline, wherein the insertion shoe is provided with an angled exit through which the balloon-like element can be properly positioned in a pipeline. In some embodiments, the bottom part of the introducer shoe is shaped parabolic.

The shock absorber may comprise a first part that is in connection to the hose, and a second part that is in connection to the inflatable balloon-like element. The second part may thereby be received in the first part, or vice versa. The first part of the shock absorber may further comprise a secured coupler that connects the first part of the shock absorber with the hose.

The second part is arranged such that the second part can move in the longitudinal direction with respect to the first part, or vice versa. The first part and/or second part may be provided with one or more resilient members, such as helical springs.

The first part and/or second part may also be provided with one or more sealing rings or O-rings, for providing sealing means of the shock absorber and hose and thereby preventing leaking of the medium that is used to inflate the balloon-like element.

The first part may comprise a female-type connector which may comprise a housing made from, for example, stainless steel, titanium, carbon steel, aluminum or brass. The second part may comprise a rod which is made from, for example, stainless steel, titanium, carbon steel, aluminum or brass. The at least one resilient member may be provided in the housing.

In some embodiments, the parts of the shock absorber are arranged such that a passage is facilitated for the passage of medium used for inflating the balloon-like element. In that case, the parts of the shock absorber form a part that connects the hose with the inflatable balloon-like element.

In other embodiments, the hose forms a connection that connects the pressure rod with the balloon-like element. That is, one end part of the hose is connected to the pressure rod by means of for instance a threaded coupling. The other end part of the hose is connected to the balloon-like element by means of for instance a coupling forming a conical body. The shock absorber in that case may for instance be provided around the part of the hose that is connected with inflatable balloon-like element.

During introduction of the balloon-like element in the pipeline, the balloon-like element may be dragged by the flow in the pipeline. The rod may thereby move along inside the housing in the direction of the pipeline flow, and may thereby compress or stretch the at least one resilient member, which has a sufficient spring constant and is made from a sufficient strong material to recoil the kinetic forces that are imposed on the hose-balloon connection during inflation of the balloon-like element in the pipeline, and thereby provide for recoiling means. The flow stopping tool according to the first aspect of the invention is therefore able to resist a kinetic force of 1000 kgf or more, preferably 2000 kgf or more, even more preferably 3000 kgf or more and most preferably 4000 kgf or more.

The skilled person further understands that the shock absorber may comprise any other type of resilient member, system or other type of spring such as a resilient beam or a hydraulic system, thereby providing for said recoiling means.

In a second aspect of the invention there is provided for a shock absorber, wherein the shock absorber is compatible for use with a flow stopping tool for pipelines and arranged according to a shock absorber of a flow stopping tool for pipelines according to the first aspect of the invention. The first part of the shock absorber may comprise a secured coupler that connects the first part of the shock absorber with the hose. This coupler is arranged for receiving the first part of the shock absorber. For instance, the secured coupler may comprise threads that fit on a threaded profile that is provided on the first part of the shock absorber. The skilled person understands that other embodiments of the secured coupler may also be used in order to securely couple the first part of the shock absorber to the hose. Thus, the secured coupler facilitates connection means of the shock absorber to the hose and thus allows for easy implementation of the shock absorber onto for instance a hose of an existing flow stopping tool.

In another aspect of the present invention, there is provided a method for stopping a flow in a pipeline, comprising the steps of: installing a flow stopping tool according to the first aspect of the present invention; inserting the balloon-like element into the pipeline by moving the pressure rod in the direction of the pipeline; and inflating the balloon-like element for stopping a flow in the pipeline.

In some embodiments, the following steps are performed prior to installation of the flow stopping tool: mounting a ball valve or a gate valve onto a saddle or welded socket that is mounted onto the pipeline; drilling a hole into the pipeline at a location where the ball valve or gate saddle is mounted onto the pipeline.

In yet another aspect of the present invention, there is provided a procedure for creating an isolated section free of flow or a section free of flow within a pressurized pipeline with flow, comprising the steps of: installing at least one flow stopping tool onto a pipeline by preference installing a second flow stopping tool onto a pipeline; by preference installing a third flow stopping tool onto a pipeline; by preference installing a fourth flow stopping tool onto a pipeline; wherein all four stopping tools each comprise: an external dome with internal hollow moveable lance for inserting a balloon-like element into a pipeline; a balloon-like element for blocking a pipeline flow, wherein the balloon-like element is made of natural reinforced rubber, an elastomer or an elastic material; means to facilitate inflation of the balloon-like element; a pressure rod that is movably arranged within the internal hollow moveable lance, and wherein at least one of the stopping tools is provided with a shock absorber according to the second aspect of the invention, for securing the balloon-like element of said at least one stopping tool; introducing the at least one balloon-like element of the stopping tool with said shock absorber as the first to be inflated balloon-like element into the pipeline by moving the pressure rod of said balloon-like element in the direction of the pipeline; inflating said at least one balloon-like element such as to stop the flow in the pipeline.

In some embodiments, prior to installation of the four flow stopping tools the following steps are performed: mounting up to four ball valves or gate valves onto welded sockets or saddles that are on the pipeline; drilling a hole into the pipeline at a location where the ball valve or gate valve is mounted on the pipeline.

Other features and advantages of the present invention will be apparent from the detailed description that follows.

BRIEF DESCRIPTION OF THE ACCOMPANYING DRAWINGS

The present invention is described with respect to particular exemplary embodiments thereof and reference is accordingly made to the drawings in which.

Figure 3A:
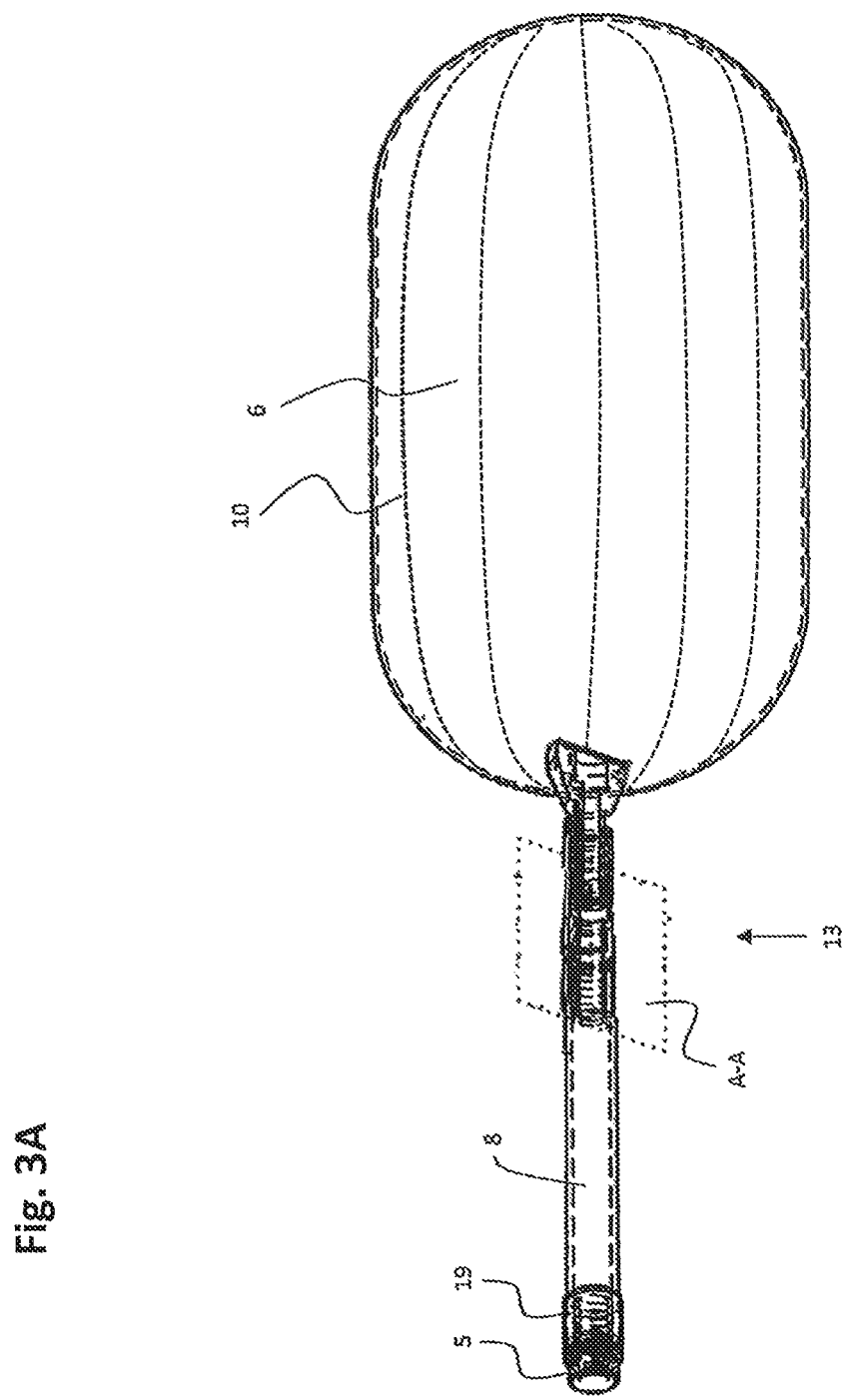
FIG. 3A shows an exemplary embodiment of a flow stopping tool that is provided with a shock absorber.
Figure 3B:
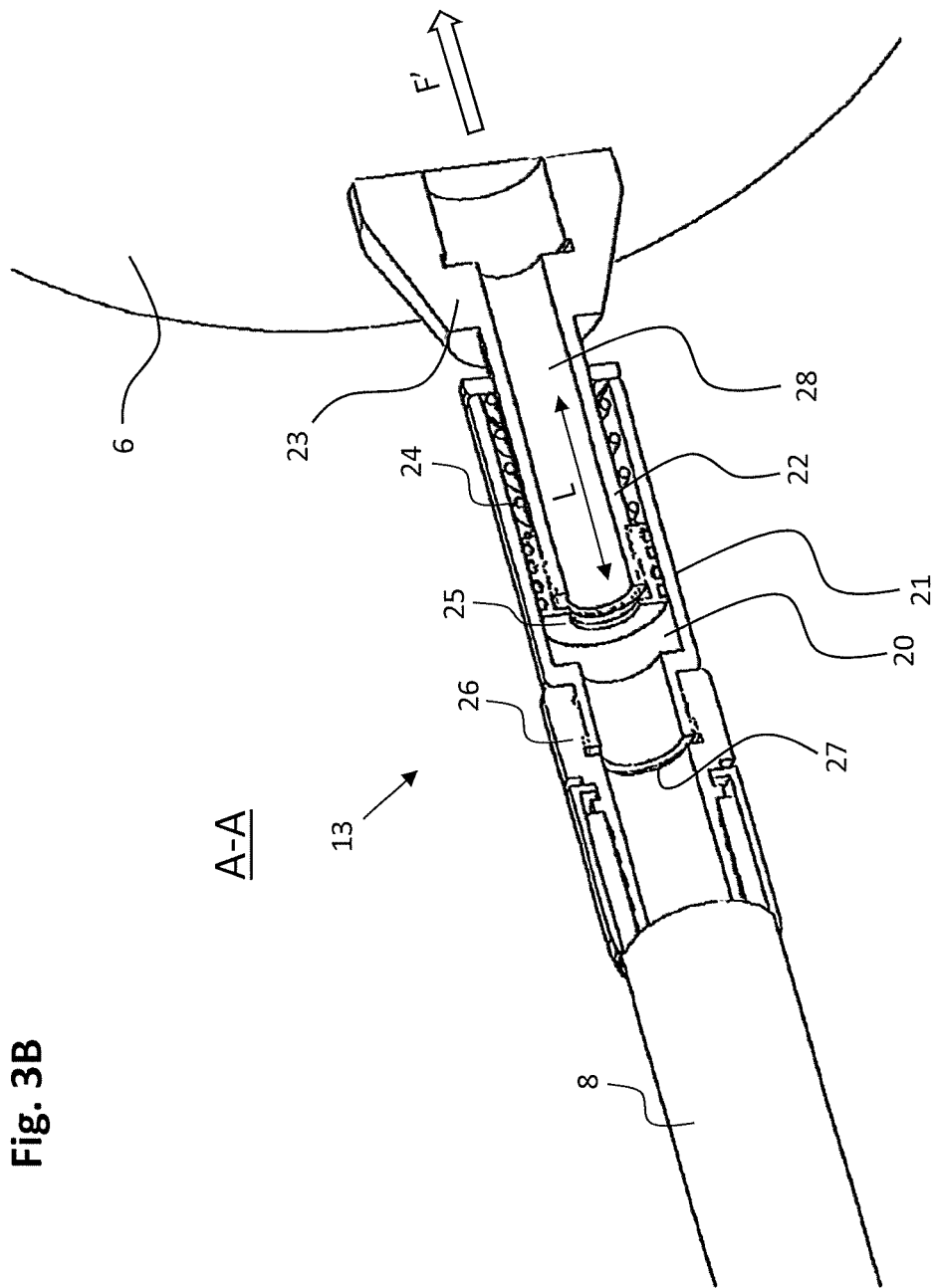
Figure 3C:
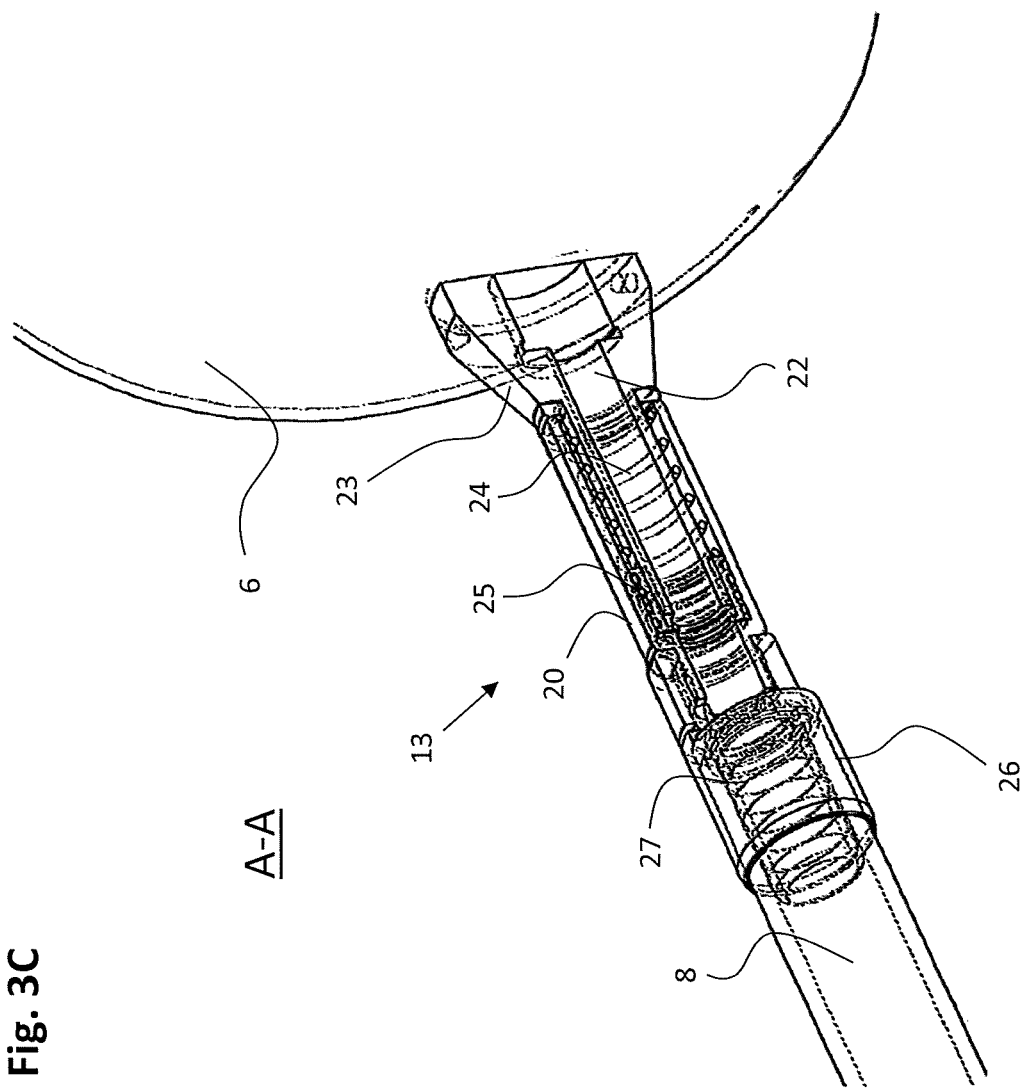
Figure 3D:
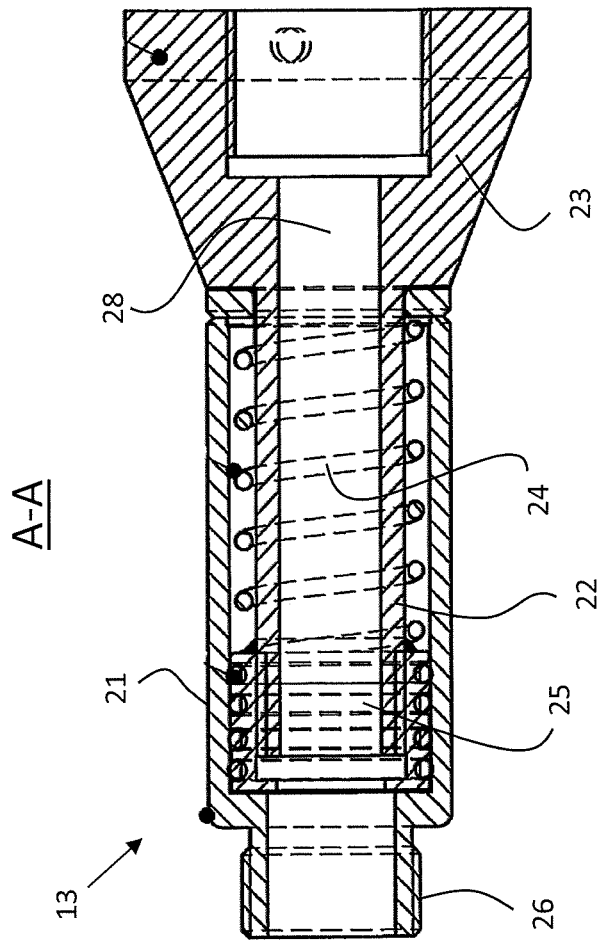

FIGS. 3B-C show a cross section of the shock absorber of the exemplary embodiment of FIG. 3A;

FIGS. 3D-E show a cross section of the shock absorber of FIGS. 3A-C in more detail.

FIG. 4 shows an example of an isolated section with no flow in a pipeline that is created by using one or multiple flow stopping tools, in which at least one of the flow stopping tools is provided with a shock absorber.

The drawings show only those details essential to an understanding of the present invention.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. Furthermore, this description is not to be considered as limiting the scope of the embodiments described herein in any way, but rather as merely describing the implementation of the various embodiments described herein.

Figure 1:
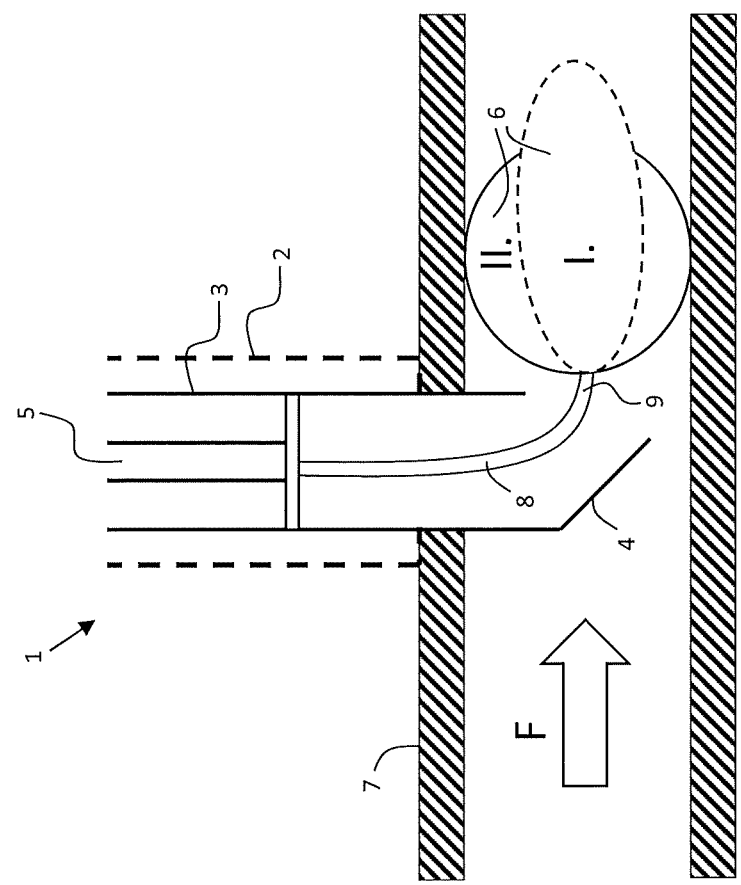
FIG. 1 shows a prior art flow stopping tool.

With reference to FIG. 1, a prior-art flow stopping tool 1 is shown. The flow stopping tool 1 comprises an external dome 2, a moveable lance 3 that can move within external dome 1. Movable lance 3 comprises an insertion shoe 4 and a moveable pressure rod 5 with a balloon-like element 6 as closing plug. The pressure rod 5 may comprise a device for measuring the inflation pressure of the balloon-like element (not shown). In use, the balloon-like element 6 blocks a flow (F) within a pipeline 7.

During insertion of the balloon-like element 6 into the pipeline 7, the balloon-like element 6 is in a deflated state (I). When properly aligned with respect to the pipeline, the balloon-like element 6 is pressurized with a gas or fluid through a hose 8. The balloon-like element 6 is thereby brought into an inflated state (11) such that it closes the passage of the pipeline 7 by providing sufficient pressure on the inner wall of the pipeline 7. During inflation of the balloon-like element 6, the balloon-like element 6 expands and shortens.

The hose 8 is used to guide compressed air from a pressure source (not shown) into balloon-like element 6. Hose 8 comprises an end part 9 that is in connection with the balloon-like element 6. The end part 9 functions to secure the balloon-like element 6 in position during the inflation phase. It may appear that the balloon-like element 6 and the hose end part 9 may experience a high initial kinetic force from the pipeline flow (F). For instance, the flow (F) in the pipeline 7 may propagate with a speed of 5 meter per second or higher. As a consequence, the hose end part 9 and/or the balloon-like element 6 may get damaged during the inflation phase, which may result in a leakage of the compressed air. In a worse case, the balloon-like element 6 may be completely ruptured off from the hose 8.

Figure 2:
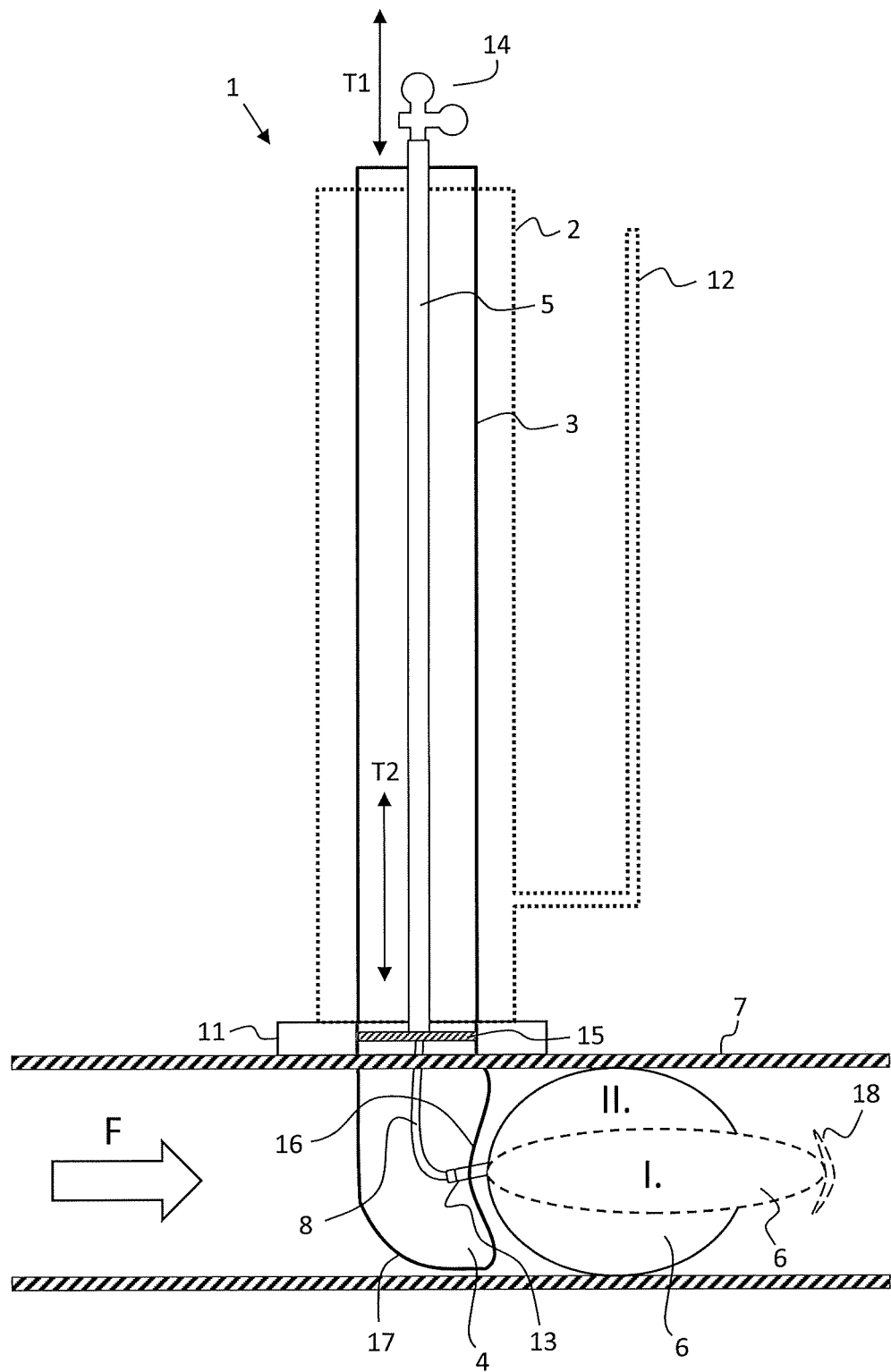
FIG. 2 shows a flow stopping tool that is provided with a shock absorber.

Reference is made to FIG. 2, which shows a flow stopping tool according to the teachings of the present invention. Flow stopping tool 1 comprises a balloon-like element 6 for blocking a flow (F) in a pipeline 7. Pipeline 7 is for instance a gas pipeline or a liquid pipeline. An example of a balloon-like element 6 is an inflatable closing plug such as manufactured by the methods according to U.S. Pat. No. 5,477,886 or according to U.S. Patent Application US 2012/0192983 A1, the disclosures which are hereby incorporated by reference herein in their entirety. Flow stopping tool 1 may comprise a balloon-like element 6 according to said referred method. Such balloon-like elements are compatible with strong pipeline flows, and are able to resist a back pressure of for example up to 4 bar (58 psi).

The balloon-like element 6 can be inflated through a hose 8 which is connected to a pressure source (not shown). The balloon-like element 6 is inflatable since it is made from an inflatable material, such as an elastic material (e.g. latex or synthetic rubber), and may further comprise a wire or a group of wires 10 (not shown) with low elasticity that extend from one end to the other end of the balloon-like element 6. The wire or wires 10 may for instance consist of steel, fiber glass, ultra-high molecular weight polyethylene (e.g. Dyneema®) or aramid (e.g. Twaron® or Kevlar®), which can be spun beforehand to wires, and are adhered to the surface of the balloon.

Flow stopping tool 1 further comprises an external dome 2 arranged for introducing the balloon-like element 6 into a pipeline 7. The external dome 2 may be installed on top of a ball valve or gate valve 11 that is mounted on the pipeline 7. The external dome 2 may be provided with a by-pass 12 for bypassing a pipeline flow (F) in pipeline 7. The external dome 2 may comprise a moveable internal hollow lance 3 configured to move up and down in the direction as indicated by (T1). In turn, the moveable lance 3 may comprise a pressure rod 5 configured to move up and down in the direction as indicated by (T2). In the present exemplary embodiment, pressure rod 5 is in connection with balloon-like element 6 via a shock absorber 13. Pressure rod 5 may be provided with a device for measuring the pressure in front of the of the balloon-like element, comprising for instance a pressure gauge 14. Furthermore, the pressure rod 5 may be connected to the hose 8 via a plate 15 that seals the hollow passage inside the movable lance 3 and prevents leaking of the pipeline flow's medium (F) into the upper part of the movable lance 3.

The movable lance 3 may comprise an insertion shoe 4 with an exit 16 for facilitating the insertion of the balloon-like element 6 into pipeline 7 through exit 16. The bottom part 17 of insertion shoe 8 may be shaped parabolic. This has the advantage that the balloon-like element 6 does not get stuck or damaged during insertion of the balloon-like element 6 into pipeline 7. Furthermore, balloon-like element 6 may be provided with a flap 18 which protects the balloon-like element 6 during initial contact with pipeline 7 during inflation. Flap 18 may be made from a rubber material. Balloon-like element 6 may also be provided with a flap 18 at either sides of the balloon-like element 6.

During operation, first the movable lance 3 is inserted into the pipeline 7. Thereafter, the balloon-like element 6 is inserted into the pipeline 7 by moving the pressure rod 5 towards the pipeline 7. The balloon like element 6 starts in the deflated state (I) and is inserted into the pipeline 7 through movement of the movable lance 3. The balloon-like element 6 is thus pushed into the bottom part 17 of the introducer shoe 4 which was inserted into pipeline 7. While pushing downwards, the balloon-like element 6 is further advanced into pipeline 7, which is shown in FIG. 2. The balloon-like element 6 may be inserted into the pipeline 7, with the flow (F) or against the flow. Preferably, the balloon-like element is inserted with the flow, as shown in FIG. 2.

When properly aligned with respect to the pipeline 7, the balloon-like element 6 is pressurized with a medium like air or a fluid bringing the balloon-like element 6 in the inflated state (11). The medium used for inflation may be compressible or incompressible, for example air, nitrogen, hydraulic oil or water. The balloon-like element 6 is thereby brought into an inflated state (11) such that the balloon-like element 6 closes the passage of the pipeline 7 by providing sufficient pressure on the inner wall of the pipeline 7. Due to the non-elastic fibers that are embodied in the wall of the rubber body of the balloon like element 6 and the spring mechanism that extends from one end to the other end inside the balloon like element, the balloon-like element shortens while it expands, as the expansion of the internal volume is limited by the applied and embodied fibers onto the rubber wall of the balloon like element 6, the balloon like element can be inflated to a high inflation pressure and will create sufficient shear resistance in order to properly and safely block the pressure and pipeline flow (F).

Reference is made to FIG. 3A, which shows the balloon-like element 6, in greater detail. In this figure, the group of wires 10 are visible. Furthermore, the hose 8 and a part connecting the hose 8 with the inflatable balloon-like element 6 is visible. The hose thereby comprises a coupling element that is in connection to the pressure rod 5, which in this exemplary embodiment is a threaded coupling 19. The part connecting the hose 8 with the inflatable balloon-like element 6 comprises a shock absorber 13. A plane A-A is indicated, which will be the plane of reference for the FIGS. 3B-E. Furthermore, it is noted that the shock absorber 13 is provided outside the balloon-like element 6, which is also apparent from FIGS. 3A-C.

The shock absorber 13 connects the hose 8 with the balloon-like element 6, such that the shock absorber 13 strengthens the otherwise fragile hose-balloon connection.

Reference is made to FIGS. 3B-C, which show a cross section of the shock absorber 13 in the plane A-A. Shock absorber 13 comprises a first part that is in connection to the hose 8, and a second part that is in connection to the inflatable balloon-like element 6. The second part may be received in the first part or vice versa. In this exemplary embodiment, the first part comprises a female-type connector 20 comprising a housing 21. Housing 21 may be made from, for example, stainless steel, titanium, carbon steel, aluminum or brass. Housing 21 receives the second part which is in the present exemplary embodiment a hollow rod 22. Rod 22 may be made from, for example, stainless steel, titanium, carbon steel, aluminum or brass. The second part of the shock absorber 13 further comprises a conical body 23 which is in direct connection to the balloon-like element 6.

The first and second part of the shock absorber 13 are arranged such that the first part and second part can move in the longitudinal direction with respect to one another. The longitudinal direction is indicated by direction arrow (L). In the present exemplary embodiment, the rod 22 can move in housing 21 in the longitudinal direction.

Housing 21 is provided with at least one resilient member. In the present exemplary embodiment, housing 21 is provided with a resilient member which is a helical spring 24. During introduction of balloon-like element 6 into pipeline 7, the balloon-like element is dragged into the direction of the flow (F'), which in this example corresponds to pipeline flow (F). As the balloon-like element 6 moves in the direction (F'), rod 22 moves along this direction in housing 21, and thereby compresses helical spring 24. Helical spring 24 has a sufficient spring constant and is made from a sufficient strong material to recoil the kinetic forces that are imposed on the hose-balloon connection during inflation of the balloon-like element 6 into the pipeline 7, and thereby provide for a recoiling force. Thus, shock absorber 13 provides further securing means to secure the balloon-like element 6 into position in the pipeline 7 and prevents the balloon-like element 6 to be ruptured off from the flow stopping tool 1. Although in the present exemplary embodiment a helical spring is used as resilient member, the skilled person understands that other resilient members, systems or other type of springs may be used, for instance a resilient beam or a hydraulic or pneumatic system. Furthermore, one ore more helical springs or other type of resilient members may also be located at the other side of housing 21 and may be attached to housing 21 and rod 22. The helical spring thereby may be stretched instead of compressed in case the balloon-like element 6 is introduced in pipeline 7. In this configuration, the at least one helical spring still provides for a recoiling force. The skilled person understands that the shock absorber 13 may comprise a combination of resilient members located at said two locations in housing 21.

Housing 21 may be further provided with one or more sealing rings or O-rings 25. In the present exemplary embodiment, the sealing rings 25 are attached to the end of rod 22. Sealing rings 25 seals the rod 22 in housing 21 and thereby prevent leakage of the medium that is used for inflating the balloon-like element.

The first part of the shock absorber 13 (e.g. female-type connector 20) may comprise a secured coupler 26 that connects the first part of the shock absorber 13 with the hose 6. Coupler 26 is arranged for receiving the first part of the shock absorber 13. Coupler 26 may for instance have a threaded profile 27. Coupler 26 may easily be mounted onto hose 6 and thereby facilitates connection means of the shock absorber 13 to the hose 6. Secured coupler 26 thus allows for easy implementation of the shock absorber 13 onto the hose of existing flow stopping tools.

In the present exemplary embodiment, secured coupler 26 and the parts of the shock absorber are arranged such that a passage 28 is facilitated for the passage of medium used for inflating the balloon-like element. The skilled person however understands that a similar passage may also be used for guiding the hose 8, such that the hose 8 is connected to the balloon-like element 6. In that case, the hose 8 forms a connection that connects the pressure rod 5 with the balloon-like element 6. That is, one end part of the hose 8 is connected to the pressure rod 5 by means of for instance a threaded coupling. The other end part of the hose 8 is connected to the balloon-like element 6 by means of for instance a coupling forming a conical body 23. The shock absorber in that case is then provided around the part of the hose 8 that is connected with inflatable balloon-like element 6.

Reference is made to FIGS. 3D and 3E, showing the shock absorber 13 of FIGS. 3A-C in cross section A-A in greater detail. FIG. 3D shows the unstressed starting position (G) of shock absorber 13. In the starting position (G), the energy stored in shock absorber 13 as a result of the potential kinetic force onto the balloon is minimum, corresponding for instance to an unstretched or uncompressed helical spring 24. For instance, in the starting position (G), the balloon-like element is in rest. Shock absorber 13 is brought into a stressed state (E) once the balloon-like element starts to experience a force, from instance from the flow (F) in pipeline 7. In the exemplary embodiment of FIGS. 3A-E, the helical spring 24 is compressed in this state in the shock absorber 13. In the stressed state (E), energy will be stored in the shock absorber 13, thereby absorbing the energy from flow (F) in pipeline 7. Said gained potential energy is subsequently used for recoiling balloon-like element 6 in pipeline 7.

Due to the strong securing connection that the shock absorber 13 provides, shock absorber 13 allows the balloon-like element 6 to absorb higher kinetic forces and energy, generated by the flow, than conventional flow stopping tools. Simulations and experimental tests have shown that a flow stopping tool for a pipe diameter of 300 mm, provided with said shock absorber can resist a force generated by a pressure of 4 bar and a flow speed of 5 meter per second. The corresponding kinetic force is equal to:

KINETIC FORCE=$C$×STATIC FORCE=$1.49 \times \pi R^2 \times P_0$ wherein C is a dimensionless constant which is equal to 1.49 and wherein R is the radius of the pipeline which is in this case 0.15 meter and P0 is the static pressure which is in this case equal to 4 bar. This results in a kinetic force of 4296 kgf. Thus, the flow stopping tool according to the present invention can withstand such a force, whereas conventional flow stopping tools in which the balloon-like element is merely secured by a hose are not compatible with said strong flows. Hence, the balloon-like element 6 with shock absorber 13 is suitable for resisting a kinetic force of 1000 kgf or more, preferably 2000 kgf or more, even more preferably 3000 kgf or more, and most preferably 4000 kgf or more.

The present invention is of particular advantage for flow stopping tools comprising relatively large balloon-like elements, for example, balloon-like elements having a diameter when inflated of about 250 mm or higher, like for example in the range between 250 and 600 millimeter, and adapted to close pipes in the range between 250 and 600 mm.

Installation of a flow stopping tool 1 may be performed as follows: a gate valve or ball valve 11 may be mounted onto the pipeline 7. Subsequently, a hole may be drilled into the pipeline 7 at the location on the pipeline 7 where a gate valve or ball valve 11 is mounted. Reference is made to FIG. 4, which shows four flow stopping tools 1a, 1b, 1c and 1d that are used to create an isolated section 29 with no flow within a pipeline 7. Isolated section 29 may be created for several different reasons, e.g. isolated section 29 requires maintenance. Prior to installation of the flow stop tool branched saddles or welded sockets 11a, 11b, 11c and 11d may be mounted onto the pipeline 7. Alternatively gate or ball valves may be mounted onto the saddles. Subsequently, a hole may be drilled into the pipeline 7 at each location on the pipeline 7 where a gate valve or ball valve is mounted. External domes 2a, 2b, 2c, 2d are installed onto the gate valves 11a, 11b,11c and 11d respectively. Each external dome 11a, 11b, 11c and 11d is arranged for the insertion and passage of a pressure rod 5a, 5b, 5c and 5d with a balloon-like element 6a, 6b, 6c and 6d respectively connected to pressure rods 5a, 5b, 5c and 5d. Each external dome 2a, 2b, 2c and 2d may comprise a device for measuring the pressure inside the balloon-like element, comprising for instance a pressure gauge 14a, 14b, 14c, 14d which are respectively in connection with the pressure rod 5a, 5b, 5c and 5d. Each external dome may further be provided with a by-pass 12a, 12b, 12c and 12d for bypassing a pipeline flow (F) in pipeline 7, purging nitrogen gas or flare gas from isolated section 29. At least one of the stopping towers may be a stopping tower according to the present invention. That is, at least one of the stopping towers, for example stopping tower 1a, comprises a shock absorber 13, connecting the pressure rod with the balloon-like element. This stopping tower is then used for the first balloon to be inflated as to stop the flow in the pipeline 7. However, more or all stopping towers 1a, 1b, 1c and 1d may be provided with a shock absorber 13. Alternatively, the other stopping towers, for instance stopping towers 1b, 1c and 1d, have a balloon-like element that is in connection to the pressure rod merely via a hose 8b, 8c, and 8d respectively.

When creating an isolated section 29 free of flow, a first balloon-like element 6a, 6b, 6c or 6d of one of the flow stopping tools 1a, 1b, 1c or 1d is inserted into pipeline 7, with the flow or into the direction of the flow and is subsequently brought into the inflated state. Preferably, this stopping tower is provided with a shock absorber 13. After the first balloon-like element has been placed into pipeline 7, for instance balloon-like element 6a, the remaining balloon-like elements can be introduced into pipeline 7. Placement of these remaining balloon-like elements 6b, 6c and 6d may be performed simultaneously or one after the other, and may be performed with the flow or into the direction of the flow. After all balloon-like elements 6a, 6b, 6c, 6d have been inflated and placed into pipeline 7, the isolated section 29 is free of flow whereby the medium can be removed from the isolated section 29 such that the isolated section 29 can be opened and approached. Once the operations in isolated section 29, such as maintenance work, has been finished, the balloon-like elements 6a, 6b, 6c and 6d may be deflated and retracted from the pipeline 7.

Although in above exemplary embodiment four stopping towers 1a, 1b, 1c and 1d are used to create the isolated section 29, the skilled person understands that less stopping towers may also be used to create an isolated section 29, for example with two or three stopping towers. At least one of these stopping towers may be provided with a shock absorber 13. The skilled person in the art also understands that, dependent on the circumstances, installation of more than four stopping towers may be required to create the isolated section 29. The skilled person further understands that each stopping tower, such as stopping towers 1a, 1b, 1c and 1d, may be located at any desired distance with respect to one another, depending on the circumstances such as the available space in the trench.

The present invention has been described with regard to specific embodiments; however, it will be obvious to persons skilled in the art that a number of variants and modifications can be made without departing from the scope of the invention as described herein.

The invention claimed is:

1. A flow stopping tool for pipelines, comprising:
   an inflatable balloon-like element that is adapted for blocking a flow in a pipeline;
   a stopping tower arranged for introducing the balloon-like element into the pipeline;
   a pressure rod that is movably arranged within the stopping tower;

a hose for inflating the balloon-like element with a gas or a fluid, wherein a first end of the hose is in connection to the pressure rod and a second end of the hose is in connection with a shock absorber, wherein the shock absorber is in connection with the balloon-like element and is provided in between the second end of the hose and the balloon-like element, and wherein the shock absorber is arranged to absorb kinetic forces and energy generated by the pipeline flow.

2. The flow stopping tool according to claim 1, wherein the shock absorber comprises:
   a first part that is in connection to the second end of the hose;
   a second part that is in connection to the inflatable balloon-like element;
wherein the second part is received in the first part or vice versa, and wherein the first and second part are arranged to move in the longitudinal direction with respect to one another.

3. The flow stopping tool according to claim 2, wherein the first part and/or second part are provided with one or more resilient members.

4. The flow stopping tool according to claim 3, wherein at least one resilient member is a helical spring.

5. The flow stopping tool according to claim 2, wherein the first and/or second part are provided with one or more sealing rings.

6. The flow stopping tool according to claim 2, wherein the first part of the shock absorber comprises a housing, and wherein the second part of the shock absorber comprises a rod.

7. The flow stopping tool according to claim 2, wherein the flow stopping tool further comprises a secured coupler that connects the first part of the shock absorber with the second end of the hose.

8. The flow stopping tool according to claim 1, in which the balloon-like element is suitable for resisting a kinetic force of at least 1000 kgf.

9. The flow stopping tool according to claim 1, in which the balloon-like element is adapted to close a pipe having a diameter in the range between 250 and 600 millimeter.

10. The flow stopping tool according to claim 1, wherein the stopping tower comprises:
   a movable internal lance, wherein the movable internal lance comprises a passage for insertion of the pressure rod and wherein the movable lance further comprises an insertion shoe with an exit for introduction of the balloon-like element into the pipeline;
   an external dome that is being adapted to be in fixed connection to the pipeline, wherein the external dome comprises a passage for insertion of the movable internal lance.

11. A shock absorber, compatible for use with a flow stopping tool for pipelines and arranged according to the shock absorber of a flow stopping tool for pipelines according to claim 1.

12. A method for stopping a flow in a pipeline, comprising the steps of:
   installing a flow stopping tool according to claim 1 onto a pipeline;
   introducing the balloon-like element into the pipeline;
   inflating the balloon-like element for stopping a flow in the pipeline.

13. A procedure for creating an isolated section in a pipeline free of flow, comprising the steps of:
   installing a first flow stopping tool onto a pipeline;
   installing a second flow stopping tool onto the pipeline;
   installing a third flow stopping tool onto the pipeline;
   installing a fourth flow stopping tool onto the pipeline;
   wherein all four stopping tools each comprise: an inflatable balloon-like element for blocking a flow in the pipeline;
   a stopping tower arranged for introducing the balloon-like element into the pipeline;
   a pressure rod that is movably arranged within the stopping tower;
   a hose for inflating the balloon-like element with a gas or a fluid; and wherein at least one of the flow stopping tools is arranged according to claim 1;
   introducing the at least one balloon-like element of the stopping tool with the shock absorber as the first to be inflated balloon-like element into the pipeline;
   inflating said at least one balloon-like element such as to stop the flow in the pipeline.

14. The procedure according to claim 13, wherein prior to installation of the four flow stopping tools the following steps are performed:
   mounting four ball valves or gate valves on a saddle or welded socket that are fixed onto the pipeline;
   drilling a hole into the pipeline at each location where a ball valve or gate valve is mounted on the pipeline.

\* \* \* \* \*